United States Patent
Loos

[11] 3,822,025
[45] July 2, 1974

[54] PRESSURIZED GAS SELECTOR MECHANISM

[75] Inventor: William A. Loos, Broad Brook, Conn.

[73] Assignee: The Gerber Scientific Instrument Company, South Windsor, Conn.

[22] Filed: Mar. 16, 1973

[21] Appl. No.: 341,930

[52] U.S. Cl......... 214/16.4 A, 214/1 BB, 214/1 BE, 214/8.5 E
[51] Int. Cl............................................. B65g 1/06
[58] Field of Search........ 214/16.4 R, 16.4 A, 1 BE, 214/8.5 E; 302/2 R

[56] References Cited
UNITED STATES PATENTS

| | | | |
|---|---|---|---|
| 2,271,937 | 2/1942 | Engels | 214/8.5 E |
| 3,158,287 | 11/1964 | Wilmer | 214/16.4 R X |
| 3,625,570 | 12/1971 | Ford | 214/8.5 E X |
| 3,645,581 | 2/1972 | Lasch, Jr. et al. | 214/16.4 R X |
| 3,730,595 | 5/1973 | Yakubowski | 302/2 R |

*Primary Examiner*—Robert G. Sheridan
*Assistant Examiner*—R. B. Johnson
*Attorney, Agent, or Firm*—McCormick, Paulding & Huber

[57] ABSTRACT

An apparatus for handling generally identical articles stored in a matrix of individual open-ended compartments includes a transfer receptacle movable to position it adjacent to any selected compartment. A first ejecting means comprising a pneumatic tube and nozzle directs a current of pressurized air or other gas from in front of the open end of the selected compartment toward the interface between the article in the compartment and the wall thereof. Through the influence of this gas, the article is rapidly shifted from the compartment to the adjacent transfer receptacle. One or more of the compartments may be a sending station to which articles are delivered by the transfer receptacle for transport to remote points, and another one or more of the compartments may be a receiving station to which articles are returned from the remote point. The remainder of the compartments are storage stations. An article carried by the transfer receptacle is returned to the matrix by a second ejecting means including a member movable relative to the transfer receptacle for pushing the article from the receptacle into the compartment adjacent to which the receptacle is positioned.

13 Claims, 5 Drawing Figures

PATENTED JUL 2 1974    3,822,025

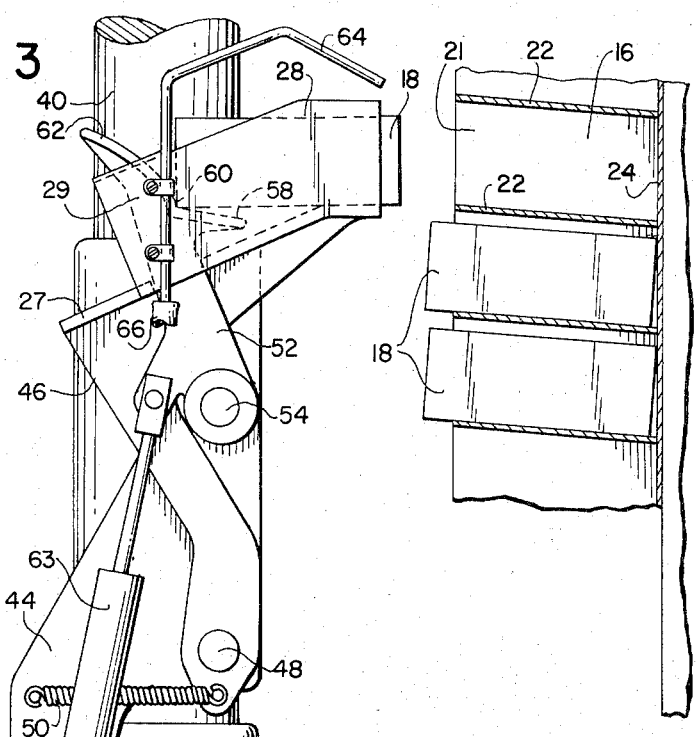
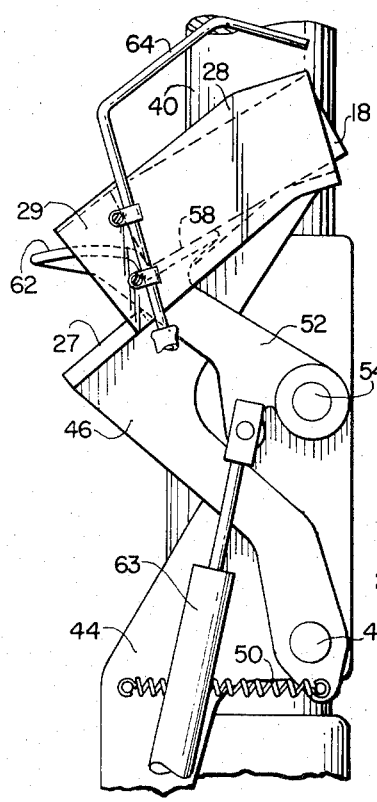
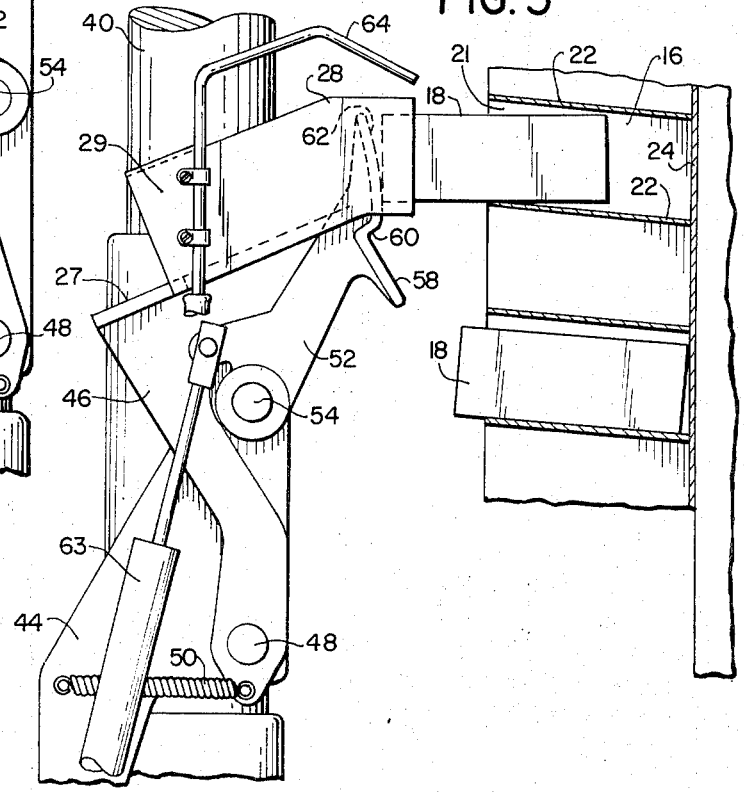

3,822,025

PRESSURIZED GAS SELECTOR MECHANISM

BACKGROUND OF THE INVENTION

This invention relates to article-handling devices, and deals more particularly with such devices wherein a plurality of articles are held in a stored condition subject to being selectively withdrawn from storage, used, and thereafter returned to storage.

The device of the invention has utility in many different applications. One application to which it lends itself particularly well is as a memory unit for a computer wherein the handled articles are generally identical magnetic tape cartridges. Each of these cartridges holds a certain amount of recorded data kept on file for use from time to time by the computer. In the past, many devices have been proposed and constructed for handling articles used infrequently and stored when out of use in storage racks or holders of some sort. Generally, however, these prior devices have been limited to the storage of a relatively small number of articles, have been relatively slow in operation, have been of relatively complex construction, or have had other disadvantages. The general object of this invention is to provide an improved device of this character which, among other things, may be designed for use with a given set of stored articles which set may range in number from only a few articles to hundreds or thousands or more articles, and which device is rapid acting and reliable and yet of a simple, inexpensive construction.

In the device of this invention, the articles are filed by storing them in a large matrix of open-ended compartments individually indentifiable by X and Y or otherwise coded addresses. To retrieve an article from storage, a selector mechanism is referred and moved to that article's address in the storage matrix. A jet of air or other gas is then used to shift the article from its compartment to a transfer receptacle, forming part of the selector mechanism, which carries it to a sending station for subsequent transport to a remote point of use. After the article has been used, it is transported back to a receiving station in the matrix and the selector mechanism is thereafter used to return it from the receiving station to its own compartment where it is again deposited for future reference.

SUMMARY OF THE INVENTION

This invention resides in a mechanism for selectively removing and replacing articles which are individually stored in a matrix of open-ended compartments. The mechanism includes a base member which is movable relative to the matrix to bring it into an operative position relative to any selected one of the matrix compartments. A main arm movably mounted on the base member carries an open-ended transfer receptacle which, by movement of the arm relative to the base member, is movable between a retracted position spaced from the matrix and an article-transfer position closer to the matrix.

A guide arm is also mounted on the base member and moves in timed relation to the movement of the main arm relative to the base. During the withdrawal of an article from the matrix, the guide arm limits the outward movement of the article and aids in guiding it into the receptacle. During return of an article to the matrix, the guide arm pushes it out of the receptacle and into the selected matrix compartment.

The invention also resides in a unique ejector mechanism for removing an article from its storage compartment and for forcing it into the awaiting receptacle. This ejector mechanism comprises a pneumatic tube and nozzle which directs, preferably in the form of a short blast, a current of pressurized air or other gas, from in front of the open end of the selected storage compartment, toward the interface between the wall of the compartment and the article therein. This application of pressurized gas has the effect of rapidly and in a very simple manner propelling the stored article from its compartment and into the awaiting receptacle where it is brought to rest by the guide arm.

DESCRIPTION OF THE DRAWINGS

FIG. 3 is similar to FIG. 2 but shows the transfer receptacle and guide arm in the positions occupied some time after the initiation of the ejection of an article from its storage compartment and before reaching their retracted positions.

FIG. 4 is similar to FIG. 3 but shows the transfer receptacle and guide arm in their fully retracted positions.

FIG. 5 is similar to FIG. 4 but shows the selector mechanism in the process of returning an article to the matrix.

DETAILED DESCRIPTION OF THE PREFERRED EMBODIMENT

Figure 1:
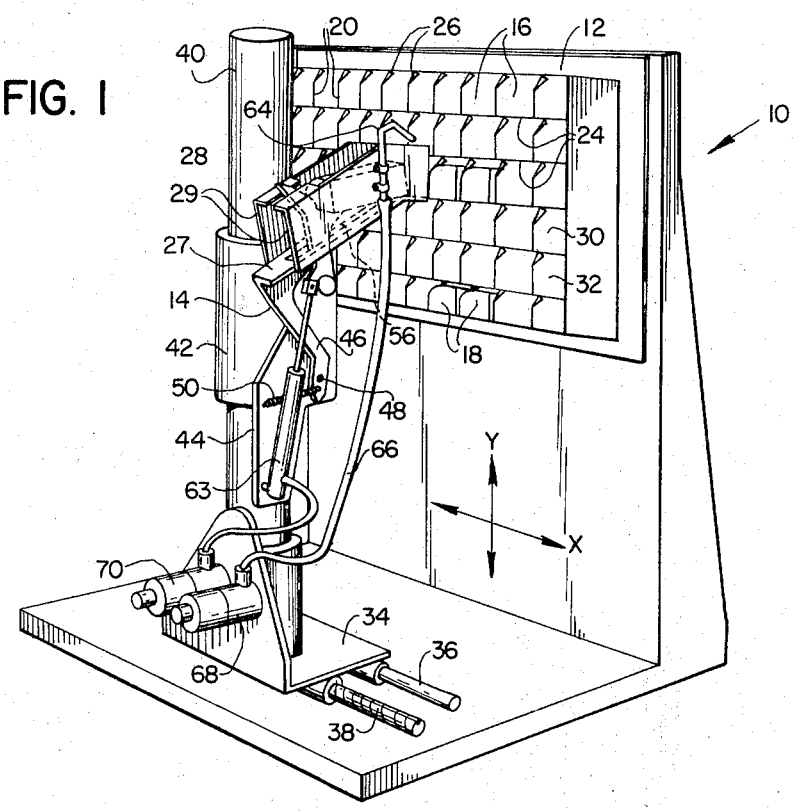
FIG. 1 is a perspective view of an apparatus comprising a preferred embodiment of the invention and showing the selector mechanism thereof in a state occurring partway through the step of withdrawing an article from its storage compartment.

Referring first to FIG. 1, an article-handling apparatus incorporating the present invention is there indicated generally at 10 and comprises basically a storage matrix 12 and an associated selector mechanism 14. The storage matrix 12 is in the form of a generally vertical wall which includes a plurality of generally horizontal open-ended storage compartments 16, 16. The storage compartments 16, 16 receive a plurality of generally identical articles 18, 18 with each article 18 being received in a respective one of the compartments 16, 16. For convenience, in FIG. 1, only a small number of articles 18, 18 have been shown in the compartments 16, 16 of the matrix 12, but it will be understood that in a typical application most or all of the compartments of the matrix may be filled with stored articles. It should also be understood that in FIG. 1 the matrix 12 has been shown to be of a relatively small size and to include a relatively small number of compartments 16, 16. The matrix is, however, not limited to this size and may be extended so as to include a much larger number of compartments. In some applications of the invention, for example, the matrix may include hundreds or thousands of compartments similar to the illustrated compartments 16, 16.

The articles 18, 18 stored in the matrix 12 may vary widely in nature, but in a preferred use of the device 10 these articles are magnetic tape cartridges or similar modules containing a recording medium on which is stored a relatively large amount of data usable by an associated computer, the articles 18, 18 forming a part of the computer memory. The data which is stored on these cartridges is information which is used only infrequently by the computer and the purpose of the illustrated selector mechanism 14 is to withdraw from the matrix 12 any desired article 18 when it is needed by the associated computer, or by some other using instrumentality, and to then return the article to its storage compartment after it has been used.

Figure 2:
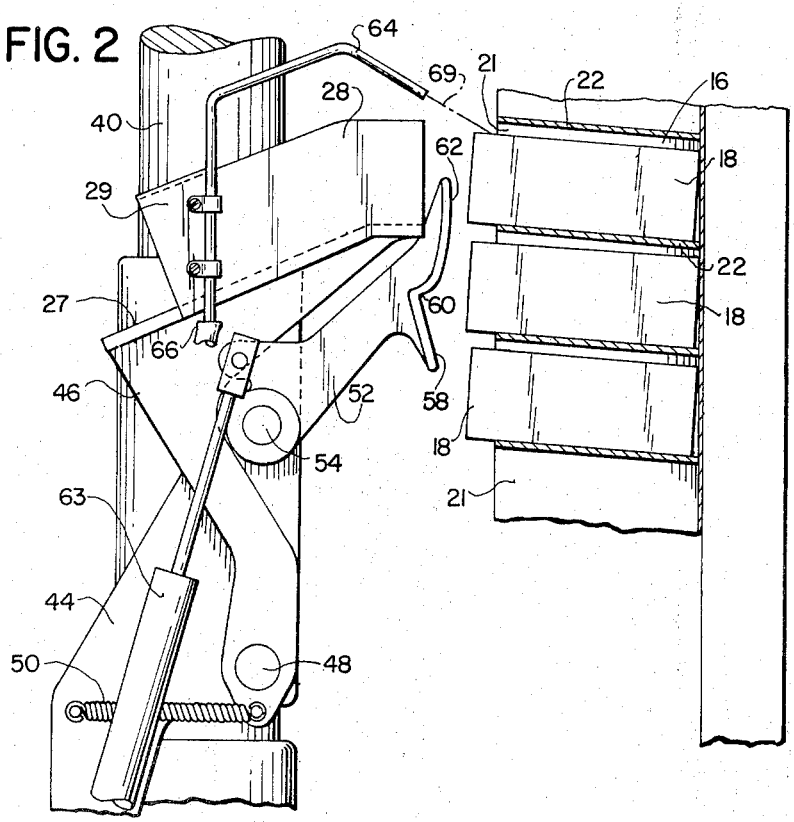
FIG. 2 is an enlarged partial side elevational view of the apparatus of FIG. 1 and shows the transfer receptacle and the guide arm of the selector mechanism in their article-awaiting positions adjacent the storage matrix.

Before leaving the matrix 12, it should be noted, as shown for example in FIG. 2, that each storage compartment 16 thereof has one open end facing the selector mechanism 14 and is otherwise entirely closed, each compartment being formed by two spaced vertical side walls 20, 20, two spaced horizontal walls 22, 22, and a vertical rear wall 24, all of which walls are or may be made of a thin sheet material. As also evident from FIG. 2, the horizontal walls 22, 22 are slightly inclined downwardly from the open ends 21, 21 of the compartments so that the articles 18, 18 are urged by gravity into their respective compartments. Also, as shown in FIG. 1, the left-hand side wall of each compartment 16 adjacent the upper portion of the compartment includes a tab 26 slightly bent over so as to provide the open end of each compartment with an asymmetrical shape generally similar to a square with one corner relieved. Each article 18, in turn, has a cross-sectional shape generally complementary to that of the open ends of the compartments, such cross-sectional shape being generally square except for having one rounded or relieved corner. Therefore, the bent-over tabs 26, 26 and the cross-sectional shape of the articles 18, 18 assure that each article 18 may be placed in a storage compartment 16 in only one orientation as is often desired.

Referring again to FIG. 1, the selector mechanism 14 includes a transfer receptacle 28, defined by a bottom wall 27 and two spaced side walls 29, 29, which is adapted to receive an article 18 as it is withdrawn from its storage compartment and from which the withdrawn article is later returned to its assigned storage compartment or to some other compartment of the matrix. As hereinafter described in more detail, the transfer receptacle 28 is movable relative to the matrix 12 to bring it into an operative position relative to any selected storage compartment 16. This selecting movement of the transfer receptacle may be dictated by commands from an associated computer or numerical controller, and it will be appreciated that each compartment 16 is or may be identified by a preassigned address. This address may be and preferably is in terms of X and Y coordinates, such as the coordinates shown by the arrows in FIG. 1. Movement of the transfer mechanism in the X and Y coordinate directions to bring it to a selected compartment 16 may, therefore, be generally similar to the movement of the drafting head of an X–Y plotter or the work carriage of an X–Y coordinate machine tool and the mechanism and control for so moving the transfer receptacle may be generally similar to those used for an X–Y plotter or X–Y machine tool.

The general function of the selector mechanism 14 is to withdraw any selected article 18 from the matrix 12 and to return the article to its assigned compartment after it has been used. In the apparatus 10 of FIG. 1, one of the compartments provided by the matrix 12 is a sending station and another of the compartments is a receiving station. For example, the compartment indicated at 30 may serve as a sending station and the compartment indicated at 32 may serve as a receiving station. These two stations are connected with a conveying means (not shown), such as a pneumatic tube system for transferring articles placed in the sending station compartment 30 from the matrix 12 to a tape reader or other using instrumentality and for transferring such articles, after use, from the using instrumentality back to the receiving station compartment 32. The selector mechanism 14 is, therefore, also used to convey a withdrawn article from its storage compartment to the sending station 30 and to subsequently convey the same article from the receiving station 32 back to its storage compartment 16. Of course, it should be understood that, if desired, the matrix may include more than one sending station and more than one receiving station.

The means for moving the selector mechanism 14 in the illustrated X and Y coordinate directions of FIG. 1 to bring the transfer receptacle 28 into operative position relative to any selected storage compartment 16 may take various different forms. By way of example, in the illustrated case, movement in the X coordinate or horizontal direction is achieved by a carriage 34 slidably mounted on a horizontal guide tube 36 extending in the X coordinate direction and driven by a lead screw 38 extending parallel to the guide tube 36, the lead screw 38 being driven by an associated motor, not shown. The carriage 34 includes a vertically extending post 40. Slidably mounted on the post for movement in the Y coordinate direction is a sub-carriage 42 which is moved along the post 40, in the Y or vertical coordinate direction, by an associated motor and drive means (not shown).

In addition to the transfer receptacle 28, the selector mechanism 14 also includes a first ejecting means for withdrawing an article from the storage compartment adjacent which the transfer receptacle is positioned and a second ejecting means for transferring an article carried by the transfer receptacle from the transfer receptacle back into the compartment adjacent to which it is located. For a detailed description of these ejection means and other parts of the transfer of the selector mechanism, reference is made to FIGS. 1 and 2.

As shown by FIGS. 1 and 2, a base plate 44 is carried by the carriage 42. The transfer receptacle 28 is located on the upper end of an arm 46 pivotally connected to the base plate 44 about a pivot axis 48. By pivoting the arm 46 relative to the base plate 44, the transfer receptacle 28 may be moved from an advanced or awaiting position adjacent the matrix 12 and a retracted position spaced some distance from the matrix 12. FIG. 2 shows the receptacle 28 in its advanced position, and FIG. 4 shows it in its retracted position. The arm 46 is biased toward the advanced position of FIG. 2 by a helical tension spring 50 connected between the base plate 44 and the arm 46.

Also mounted on the base plate of the selector mechanism is a guide arm 52 which is pivotally connected to the base plate 44 for movement about a pivot axis 54 located below the transfer receptacle 28. The guide arm 52 extends upwardly from the pivot axis 54 through a slot 56 in the bottom wall 27 of the transfer receptacle 28. The upper or free end of the guide arm 52 is shaped to define a generally straight shelf surface 58 and an abutment surface 60 arranged generally perpendicular to the shelf surface 58. Beyond the abutment surface 60 is a pushing surface 62 extending generally rearwardly from the abutment surface 60.

The guide arm 52 is also movable from an advanced position adjacent the matrix and a retracted position spaced farther therefrom. Movement between these two positions is achieved by a pneumatic cylinder 63 having one end connected to the base plate 44 and the other end connected to the guide arm 52 as shown. When the guide arm 52 is in its advanced position as shown in FIG. 2, the spring 50 holds the arm 46 and associated transfer receptacle 28 in the illustrated advanced position of FIG. 2. As the guide arm 52 is moved from the position of FIG. 2 toward the position of FIG. 4, the rear or left-hand edge of the guide arm 52 will eventually engage the end of the slot 56 so that continued movement of the guide arm toward its retracted position will also move the arm 46 and the transfer receptacle 28 away from their advanced positions toward their retracted positions.

The ejecting means for withdrawing an article 18 from its storage compartment 16 after the transfer receptacle has been positioned adjacent such compartment constitutes an important aspect of this invention, and as shown in FIGS. 1 and 2 includes a nozzle 64 fixed to the transfer receptacle 28 and adapted, when the transfer receptacle 28 is in its advanced position, as shown in FIG. 2, to direct a current of high pressure air or other gas toward the space or interface between the article 18 to be withdrawn and the wall of its compartment 16. It has been found that when such a current or jet of air is applied to the article and compartment in question the effect is to cause the article to be rapidly shifted out of its compartment toward the transfer receptacle. The point at which the air current strikes the article and the adjacent compartment wall is not extremely critical and may be varied. For example, the air jet may be directed toward the interface between one vertical side of the article and the adjacent vertical compartment wall or it may be directed toward the space between the top horizontal surface of the article and the adjacent horizontal compartment wall. Preferably, however, and as illustrated the articles 18, 18 are slightly longer than the compartments 16, 16 so as to project a slight amount outwardly from the compartments when in their stored positions, and the air jet is directed so as to strike the top surface of the article at an angle of between about 30° to 45° to such surface, the dotted line 69 of FIG. 2 showing the path of the air jet. Air is supplied to the nozzle 64 by a flexible tube 66 and the supply of air to the tube 66 is controlled by a solenoid-operated valve 68. The control is such that air is supplied to the nozzle 64 for only a short interval, so as to consist essentially of a relatively short blast, during which interval the guide arm 52 is moved from its advanced to its retracted position by the actuator 63. That is, as the solenoid-controlled valve 68 is operated to supply pressurized air to the nozzle 64, another solenoid-controlled valve 70 is operated to supply pressurized air to the pneumatic actuator 63 to thereby cause retracting movement of the guide arm 54 and transfer receptacle 28.

As the article is withdrawn from the storage compartment, the relative movements of the guide arm 52 and arm 46 are as shown in FIGS. 2, 3 and 4. FIG. 2 shows the guide arm 52 and the transfer receptacle 28 in their awaiting or advanced positions. With the parts in these positions, a blast of air or other gas is delivered from the nozzle 64 which causes the associated article 18 to be rapidly shifted from its storage compartment 16 toward the transfer receptacle 28. As the article moves outwardly, it engages the pushing surface 62 of the guide arm 52 and at this time the actuator 63 is operated to move the guide arm 52 rearwardly. Therefore, the guide arm moves rearwardly with the article 18 and guidingly moves it at a controlled rate into the transfer receptacle 28. FIG. 3 shows the guide arm 52 retracted to the point at which its rear edge engages the end of the slot 56 in the bottom wall of the transfer receptacle. FIG. 4 shows the guide arm moved to its fully retracted position at which the arm 46 is also moved to its fully retracted position.

From the FIG. 4 position, the sub-carriage 42 may be moved in either the X or Y coordinate direction or both to bring the transfer receptacle to a new compartment, such as the sending compartment 30, and thereafter the mechanism may be operated to transfer the carried article 18 from the transfer receptacle 28 to the sending compartment 30 or other compartment adjacent which it is positioned. In this transferral of the article from the transfer receptacle to an adjacent compartment, the operation is essentially the reverse of that shown by FIGS. 2 to 4 and the guide arm 52 serves as an ejecting means. In particular, the sequence is generally that shown by taking FIGS. 4, 3, 5 and 2 in such order. From the position of FIG. 4, the guide arm 52 is moved clockwise and, under the influence of the spring 50, the arm 46 also moves clockwise until the FIG. 3 position is reached at which further clockwise movement of the arm 46 is prohibited. From that point on the guide arm 52 moves clockwise by itself toward the FIG. 5 position and pushes the article 18 from the transfer receptacle 28 into the awaiting compartment 16. The final limited position of the guide arm 52 is as shown in FIG. 2.

As set out above, the illustrated selector mechanism 14 is described as used in a situation where an article 18 withdrawn from its storage compartment is conveyed by the transfer receptacle to another compartment or sending station for conveyance to a remote point of use with the article subsequently being conveyed by the transfer receptacle from a receiving station in the matrix back to its assigned storage compartment. Within the broader aspects of this invention, such sending and receiving stations are not necessary and it is contemplated that the transfer receptacle or other device into which the withdrawn article is taken as it is moved from its storage compartment may itself include a tape reader or other instrumentality using the article. In such a case, it would be necessary only for the article to be withdrawn from its compartment, used by the immediately adjacent receiving device and then returned to its compartment without the receiving device being moved between the withdrawal and the return of the article to its compartment. Also, instead of sending and receiving stations the matrix may include one or more compartments constituting reading or utility stations at which an article may be read or otherwise utilized. In such case, the selector mechanism would be used to move articles from their storage compartments to the utility stations and from the utility stations back to their storage compartments.

I claim:

1. In a device for storing and handling a plurality of articles of generally identical shape and size, the combination comprising: a matrix means providing a plurality of compartments, each having one open end, for individually storing articles such as aforesaid, a transfer receptacle having a receiving end, means for moving said transfer receptacle relative to said matrix storage means to position said receiving end of said receptacle adjacent the open end of any selected one of said compartments, and means for directing a current of pressurized gas from in front of the open end of the compartment adjacent which said receptacle is positioned toward the interface between the article in and the wall of said latter compartment to cause said article to be ejected out of said latter compartment and into said receptacle.

2. The combination defined in claim 1 further characterized by each of said compartments having an open end of asymmetrical shape and each of said articles having a cross-sectional shape generally complementary to that of said open ends of said compartments so that each article may be received in each storage compartment only if oriented in predetermined orientation.

3. The combination defined in claim 1 further characterized by said matrix means including at least one station to which an article may be conveyed by said transfer receptacle for purposes other than storage.

4. The combination defined in claim 1 further characterized by said matrix means including at least one compartment serving as a sending station from which articles inserted into said sending station are conveyed to a remote point of use and said matrix further including at least one receiving station from which articles are conveyed from a remote point of use back to said matrix.

5. In a device for handling articles stored individually in a plurality of open-ended storage compartments of a storage matrix, the combination comprising: a transfer receptacle having a receiving end and movable to position said receiving end adjacent any selected one of said compartments, first ejecting means for moving an article stored in the compartment adjacent which said receptacle is positioned from said compartment into said receptacle, and second ejecting means for moving an article carried by said receptacle from said receptacle into the compartment adjacent which said receptacle is positioned, said first ejecting means including means for directing a current of pressurized gas from in front of the open end of the compartment adjacent which said receptacle is positioned toward the interface between the article in and the wall of said latter compartment.

6. The combination defined in claim 5 further characterized by said articles being slightly longer than said compartments so as to extend slightly out of said compartments when received therein, said means for directing a current of pressurized gas being so arranged that said current strikes the outwardly extending portion of the article stored in the compartment adjacent which said receptacle is positioned.

7. The combination defined in claim 6 further characterized by said means for directing a current of pressurized gas being so arranged that said current strikes the top surface of said latter article.

8. The combination defined in claim 7 further characterized by said means for directing a current of pressurized gas being so arranged that said current strikes said top surface of said latter article at an angle of between 30° to 45°.

9. The combination defined in claim 5 further characterized by said first ejecting means being a nozzle attached to said transfer receptacle, and means for delivering gas under pressure to said nozzle for an interval of time after said transfer receptacle is positioned adjacent a selected compartment from which an article is to be withdrawn.

10. The combination defined in claim 5 further characterized by said storage matrix being in the form of a generally vertical wall with said open-ended storage compartments extending substantially horizontally with their open ends located in a common vertical plane.

11. The device defined in claim 10 further characterized by means for moving said transfer receptacle relative to said storage matrix which means includes a first carriage movable relative to said matrix in one of two coordinate directions defining said vertical plane and a subcarriage carried by said first carriage and movable relative to said first carriage in the other of said two coordinate directions, said transfer receptacle being mounted on said sub-carriage.

12. A device as defined in claim 5 further characterized by said second ejecting means comprising a guide arm movable relative to said transfer receptacle toward and away from said storage matrix to push an article contained by said transfer receptacle from said transfer receptacle into an adjacent compartment.

13. A device for the selective retrieval and return of similar articles stored in a matrix providing a plurality of open-ended compartments, said apparatus comprising: a base member, means for moving said base member with respect to said matrix to position it operatively relative to any selected one of the compartments of said matrix, a receptacle arm carrying a receptacle having an open end for holding a removed article, means for pivotally mounting said receptacle arm to said base member for movement between an advanced position at which said open end of said receptacle is located next to said matrix and a retracted position at which said open end of said receptacle is located farther from said matrix, a guide arm having a portion extending into said transfer receptacle, means enabling movement of said guide arm relative to said transfer receptacle arm between an advanced position adjacent said matrix and a retracted position farther from said matrix, ejection means for forcing the article stored in the selected compartment out of said compartment toward said transfer receptacle and into engagement with the guide arm, and means operable in timed relation to the operation of said ejection means for moving said guide arm from its said advanced position toward its retracted position whereby said movement of said guide arm determines the rate at which said article is moved into said transfer receptacle, said ejection means comprising a nozzle for directing a current of pressurized gas from in front of the open end of said selected compartment toward the interface between the wall of said selected compartment and said article stored therein.

* * * * *